(12) United States Patent
Kim et al.

(10) Patent No.: US 9,406,968 B2
(45) Date of Patent: Aug. 2, 2016

(54) RECHARGEABLE BATTERY

(71) Applicant: SAMSUNG SDI CO., LTD., Yongin-si, Gyeonggi-do (KR)

(72) Inventors: Tae-Sik Kim, Yongin-si (KR); Jong-Ki Lee, Yongin-si (KR); Man-Seok Han, Yongin-si (KR); Bo-Hyun Kim, Yongin-si (KR); Seong-Gi Choo, Yongin-si (KR); Dong-Hyun Shin, Yongin-si (KR); Yu-Jin Han, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 126 days.

(21) Appl. No.: 14/287,708

(22) Filed: May 27, 2014

(65) Prior Publication Data

US 2015/0093616 A1 Apr. 2, 2015

(30) Foreign Application Priority Data

Oct. 2, 2013 (KR) ........................ 10-2013-0118073

(51) Int. Cl.
*H01M 2/30* (2006.01)
*H01M 10/04* (2006.01)
*H01M 2/26* (2006.01)
*H01M 2/24* (2006.01)

(52) U.S. Cl.
CPC ............ *H01M 10/0431* (2013.01); *H01M 2/26* (2013.01); *H01M 2/263* (2013.01); *H01M 2/24* (2013.01)

(58) Field of Classification Search
CPC . H01M 10/0431; H01M 2/204; H01M 10/04; H01M 2/22; H01M 2/26; H01M 2/263
See application file for complete search history.

(56) References Cited

U.S. PATENT DOCUMENTS

| 2008/0118828 A1* | 5/2008 | Brennfoerder .......... H01M 2/24 429/160 |
| 2011/0117402 A1* | 5/2011 | Kim .................... H01M 2/0237 429/94 |
| 2013/0040191 A1 | 2/2013 | Kim |

FOREIGN PATENT DOCUMENTS

| JP | WO 03092097 A1 * | 11/2003 | .......... H01M 2/0207 |
| KR | 10-2010-0135382 A | 12/2010 | |
| KR | 10-2013-0016746 A | 2/2013 | |

* cited by examiner

*Primary Examiner* — Carlos Barcena
(74) *Attorney, Agent, or Firm* — Lee & Morse, P.C.

(57) ABSTRACT

A rechargeable battery including an electrode assembly that is chargeable and dischargeable, the electrode assembly including a first assembly portion and a second assembly portion; a case accommodating the electrode assembly therein; a cap plate coupled to the case; and an electrode terminal group connected to the electrode assembly through a lead tab, the electrode terminal group being in a terminal hole of the cap plate, wherein the electrode terminal group includes three electrode terminals that are selectively connected to first electrodes and second electrodes of the first assembly portion and the second assembly portion.

13 Claims, 4 Drawing Sheets

RECHARGEABLE BATTERY

CROSS-REFERENCE TO RELATED APPLICATION

Korean Patent Application No. 10-2013-0118073, filed on Oct. 2, 2013, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery differs from a primary battery in that it may be repeatedly charged and discharged, while the primary battery may only irreversibly convert chemical energy to electrical energy. A small sized rechargeable battery may be used as a power supply for small electronic devices such as cellular phones, notebook computers, and camcorders, and a large sized rechargeable battery may be used as a power supply for driving motors in hybrid vehicles or electric vehicles.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly that is chargeable and dischargeable, the electrode assembly including a first assembly portion and a second assembly portion; a case accommodating the electrode assembly therein; a cap plate coupled to the case; and an electrode terminal group connected to the electrode assembly through a lead tab, the electrode terminal group being in a terminal hole of the cap plate, wherein the electrode terminal group includes three electrode terminals that are selectively connected to first electrodes and second electrodes of the first assembly portion and the second assembly portion.

The electrode assembly may include a first electrode uncoated region and second electrode uncoated regions spaced apart from the first electrode uncoated region and at lateral sides of the electrode assembly.

The first electrode uncoated may be is a negative electrode uncoated region that is integrally connected to the first assembly portion and the second assembly portion, and the second electrode uncoated regions may include a first positive electrode uncoated region of the first assembly portion, and a second positive electrode uncoated region of the second assembly portion.

The three electrode terminals may include a negative electrode terminal that is connected to the negative electrode uncoated region through a negative electrode lead tab; a first positive electrode terminal that is connected to the first positive electrode uncoated region through a first positive electrode lead tab; and a second positive electrode terminal that is connected to the second positive electrode uncoated region through a second positive electrode lead tab.

The negative terminal may have a first thickness, the first positive electrode terminal may have a second thickness, the second positive electrode terminal may have the same second thickness, and the first thickness may be greater than or equal to the second thickness.

The first assembly portion may be between the negative electrode uncoated region and the first positive electrode uncoated region, and the second assembly portion may be between the negative electrode uncoated region and the second positive electrode uncoated region.

The first electrode may be connected to the negative electrode uncoated region, and may include an eleventh coated region of the first assembly portion and a twelfth coated region of the second assembly portion.

The second electrode may include a first coated region that is connected to the first positive electrode uncoated region of the first assembly portion and a second coated region that is connected to the second positive electrode uncoated region of the second assembly portion.

The first assembly portion may include separators, the separators including an eleventh separator and a twelfth separator between the eleventh coated region of the first electrode and the first coated region of the second electrode that are layered.

The second assembly portion may include separators, the separators including a twenty-first separator and a twenty-second separator between the twelfth coated region of the first electrode and the second coated region of the second electrode that are layered.

The first assembly portion may include separators, the separators including an eleventh separator and a twelfth separator between the eleventh coated region of the first electrode and the first coated region of the second electrode that are spirally wound.

The second assembly portion may include separators, the separators including a twenty-first separator and a twenty-second separator between the twelfth coated region of the first electrode and the second coated region of the second electrode that are spirally wound.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
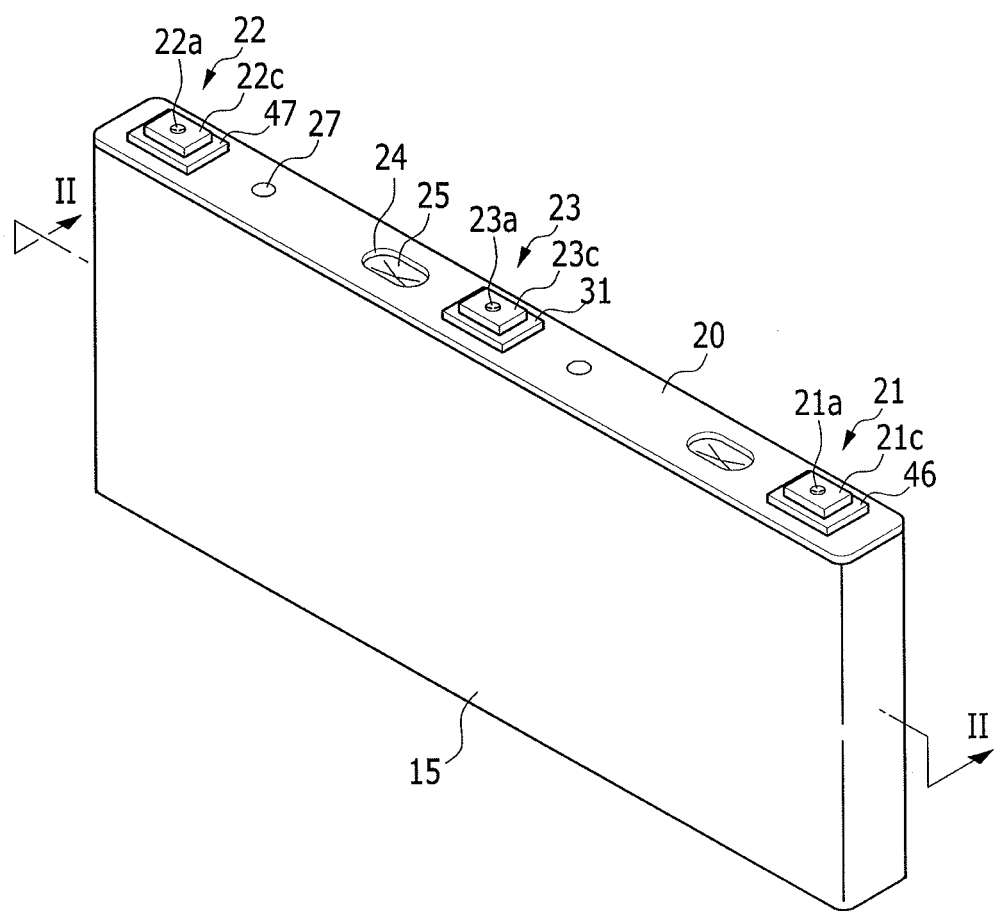
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
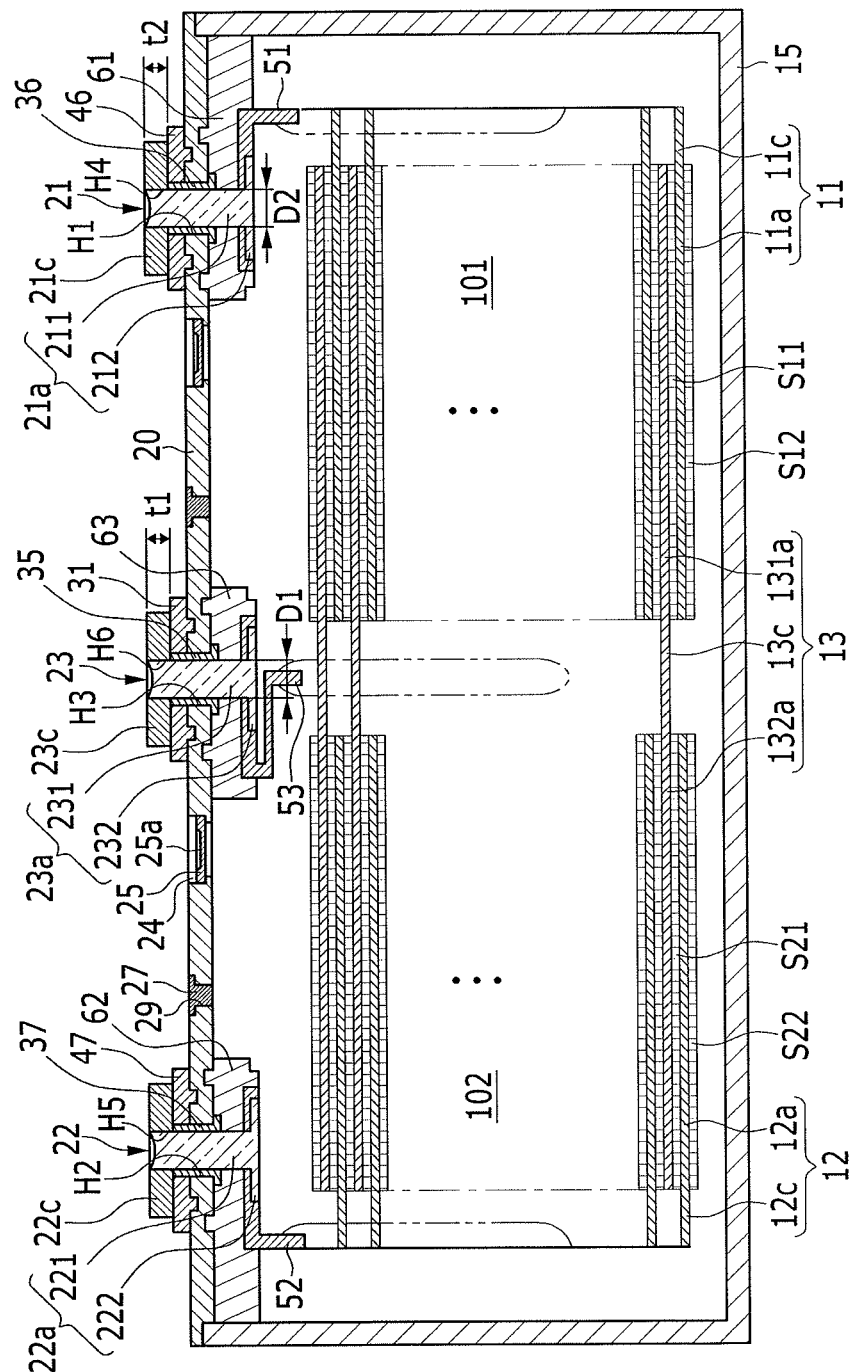
FIG. 2 illustrates a cross-sectional view of FIG. 1, taken along the line II-II.

FIG. 1 illustrates a perspective view of a rechargeable battery according to a first exemplary embodiment, and FIG. 2 illustrates a cross-sectional view of FIG. 1, taken along the line II-II. Referring to FIG. 1 and FIG. 2, a rechargeable battery according to the first exemplary embodiment may include an electrode assembly 10 that is chargeable and dischargeable and that includes a first assembly portion 101 and a second assembly portion 101, a case 15 accommodating the electrode assembly 10, a cap plate 20 coupled to an opening of the case 15, and an electrode terminal group (e.g., a negative electrode terminal 23 and first and second positive electrode terminals 21 and 22) connected through lead tabs (e.g., negative electrode lead tab 53 and first and second positive electrode lead tabs 51 and 52) and thus provided in the cap plate 20.

In the rechargeable battery of the first exemplary embodiment, three electrode terminals may be provided, and the three electrode terminals may be selectively connected to a first electrode (e.g., a negative electrode 13) and a second electrode (e.g., first and second positive electrodes 11 and 12) of the electrode assembly 10, e.g., the first assembly portion 101 and the second assembly portion 102. For example, the electrode terminals may include the negative electrode terminal 23 and two positive electrode terminal group (the first positive electrode terminal 21 and the second positive electrode terminal 22).

The first assembly portion 101 may be connected to the negative electrode terminal 23 and the first positive electrode terminal 21 in order to charge and discharge a current. The second assembly portion 102 may be spaced apart from the first assembly portion 101 and may be connected to the negative electrode terminal 23 and the second positive electrode terminal 22 in order to charge and discharge a current. For example, the negative electrode terminal 23 may be commonly applied or connected to the first and second assembly portions 101 and 102.

The first assembly portion 101 and the second assembly portion 102 may form one electrode assembly 10 by sharing the negative electrode terminal 23 and then may be installed in the case 15. Thus, in the rechargeable battery, two assembly portions, e.g., the first assembly portion 101 and the second assembly portion 102, may be connected while realizing high capacity, high power, and high safety. Thus, a connection structure may be simplified, and a manufacturing cost may be reduced, compared to a case of connecting two rechargeable batteries are individually manufactured and connected.

In addition, the electrode assembly 10 may be partitioned into the first assembly portion 101 and the second assembly portion 102. Thus, if a conductor were to be passed through or penetrate the first assembly portion 101, a current charged in the first assembly portion 101 may be discharged, and a current charged in the second assembly portion 102 may not be discharged between the negative electrode terminal 23 and the first positive electrode terminal 21. For example, stability of the rechargeable battery may be improved or maintained, even if the conductor were to be passed through or penetrate the rechargeable battery.

Figure 3:
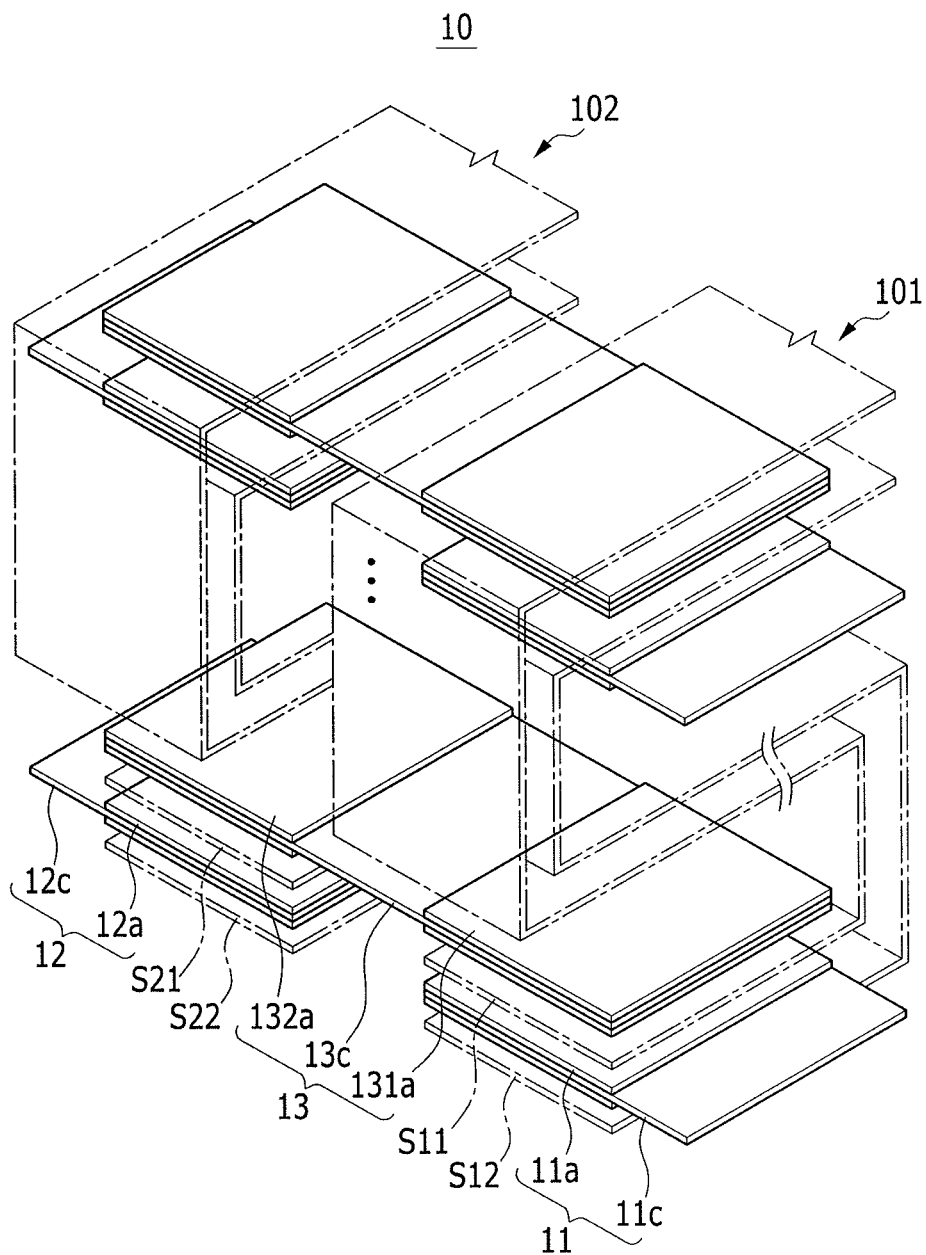
FIG. 3 illustrates a partial perspective view of layering of an electrode assembly used in FIG. 2.

FIG. 3 illustrates a partial perspective view of layering of the electrode assembly of FIG. 2. Referring to FIG. 2 and FIG. 3, the electrode assembly 10 may include a negative electrode uncoated region 13c and first and second positive electrode uncoated regions 11c and 12c at lateral ends of the electrode assembly 10 and separated from the negative electrode uncoated region 13c. The negative electrode uncoated region 13c may be integrally connected with the first assembly portion 101 and the second assembly portion 102. The first and second positive electrode uncoated regions 11c and 12c may be respectively connected to the first assembly 101 and the second assembly 102 at opposite side of the electrode assembly 10 with respect to the negative electrode uncoated region 13c.

The negative electrode terminal 23 may be connected to the negative electrode uncoated region 13c through a negative electrode lead tab 53. The first positive electrode terminal 21 may be connected to the first positive electrode uncoated region 11c through a first positive electrode lead tab 51, and the second positive electrode terminal 22 may be connected to the second positive electrode uncoated region 12c through a second positive electrode lead tab 52.

In the electrode assembly 10, the first assembly portion 101 may be between the negative electrode uncoated region 13c and the first positive electrode uncoated region 11c, and the second assembly portion 102 may be between the negative electrode uncoated region 13c and the second positive electrode uncoated region 12c.

The negative electrode 13 may include an eleventh coated region 131a and a twelfth coated region 132a each connected to the negative electrode uncoated region 13c. The eleventh coated region 131a and twelfth coated region 132a may respectively correspond to the first assembly portion 101 and the second assembly portion 102.

The first positive electrode 11 may include a first coated region 11a connected to the first positive electrode uncoated region 11c and arranged corresponding to the first assembly portion 101. The second positive electrode 12 may include a second coated region 12a connected to the second positive electrode uncoated region 12c and arranged corresponding to the second assembly portion 102.

The first assembly portion 101 may include (e.g., two sheets of) separators, e.g., an eleventh separator S11 and a twelfth separator S12 arranged between the eleventh coated region 131a of the negative electrode 13 (i.e., the first electrode) and the first coated region 11a of the first positive electrode 11 (i.e., the second electrode) that are layered with each other.

The second assembly portion 102 may include (e.g., two sheets of) separators, e.g., a twenty-first separator S21 and a twenty-second separator S22 arranged between a twelfth coated region 132a of the negative electrode 13 (i.e., the first electrode) and a second coated region 12a of the second positive electrode 12 (i.e., the second electrode).

As described above, the negative electrode 13 may include the eleventh and twelfth coated regions 131a and 132a (in which an active material is coated on current collectors of metal plates) and the negative electrode uncoated region 13c (formed as an exposed current collector that is not coated with the active material). For example, the current collector of the negative electrode 13 may be made of copper.

The positive electrode, e.g., the first and second positive electrodes 11 and 12 may respectively include the first coated region 11a and the second coated region 12a (in which an active material is coated to current collectors of metal plates) and the first positive electrode uncoated region 11c and the second positive electrode uncoated region 12c (formed as exposed current collectors that are not coated with the active material). For example, the current collectors of the first and second positive electrodes 11 and 12 may be made of aluminum.

The negative electrode uncoated region 13c may be formed in a center in a width direction of the stacked negative electrode 13. The first and second positive uncoated regions 11c and 12c may be formed at an end in a width direction of each of the first and second positive electrodes 11 and 12 along the stacked first and second positive electrodes 11 and 12. For example, the negative electrode uncoated region 13c may be disposed in a center of the electrode assembly 10, and the first and second positive uncoated regions 11c and 12c may be arranged at lateral ends of the electrode assembly 10.

Referring back to FIG. 1 and FIG. 2, the case 15 may be substantially formed in the shape of a cuboid to provide a space for receiving or accommodating the electrode assembly 10 therein. An opening of the case 15 may be formed in one side of the cuboid-shaped case 15 and may facilitate insertion of the electrode assembly 10 into the space from the outside. A cap plate 20 may be provided in the opening of the case 15 and may seal the case 15 in an air tight manner. For example, the case 15 and the cap plate 20 may be made of aluminum and thus they may be welded to each other in the opening.

The cap plate 20 may include at least one opening. For example, the cap plate 20 may include an electrolyte injection opening 29, terminal holes H1, H2, and H3, and/or a vent hole 24. The cap plate 20 may be coupled to the case 15, and then the electrolyte injection opening 29 may facilitate injection of an electrolyte solution into the case 15. After the injection of the electrolyte solution, the electrolyte injection opening 29 may be sealed with a sealing cap 27. Two electrolyte injection openings 29 may be provided respectively corresponding to the first assembly portion 101 and the second assembly portion 102 for supplying the electrolyte solution into the first assembly portion 101 and the second assembly portion 102.

The negative electrode terminal 23 and the first and second positive electrode terminals 21 and 22 may be respectively provided in the terminal holes H3, H1, and H2 of the cap plate 20 and then may be electrically connected to the first and second assembly portions 101 and 102. For example, the negative electrode terminal 23 may be electrically connected to the negative electrode 13 of the first and second assembly portions 101 and 102, and the first and second positive electrode terminals 21 and 22 may be respectively electrically connected to the first and second positive electrodes 11 and 12 of the first and second assembly portions 101 and 102. Thus, the electrode assembly 10 may be drawn out to the outside of the case 15 through the negative electrode terminal 23 and the first and second positive electrode terminals 21 and 22.

The negative electrode terminal 23 and the first and second positive electrode terminals 21 and 22 may include plate terminals 23c, 21c, and 22c (in an outer side of the cap plate 20 and corresponding to the terminal holes H3, H1, and H2) and rivet terminals 23a, 21a, and 22a (electrically connected to the electrode assembly 10 and penetrating through the terminal holes H3, H1, and H2). The rivet terminals 23a, 21a, and 22a penetrating through the terminal holes H3, H1, and H2 may be installed in the cap plate 20 and then fastened to the plate terminals 23c, 21c, and 22c.

The plate terminals 23c, 21c, and 22c may include through-holes H6, H4, and H5. The terminal holes H3, H1, and H2 may be penetrated by upper ends of the rivet terminals 23a, 21a, and 22a, which may then be inserted to the through-holes H6, H4, and H5. The rivet terminals 23a, 21a, and 22a may include pillar portions 231, 211, and 221 (inserted into the terminal holes H3, H1, and H2 of the cap plate 20) and flange portions 232, 212, and 222 (at ends of the pillar portions 231, 211, and 221). The flange portions 232, 212, and 22 may be wider than a cross-sectional areas of the pillar portions 231, 211, and 221 and may be disposed in an inner side of the cap plate 20.

A negative electrode gasket 35 and first and second positive electrode gaskets 36 and 37 may be respectively provided between the pillar portions 231, 211, and 221 of the rivet terminals 23a, 21a, and 22a and inner sides of the terminal holes H3, H1, and H2 of the cap plate 20 for sealing and electric insulation between the pillar portions 231, 211, and 221 and the cap plate 20.

The negative electrode gasket 35 and the first and second positive electrode gaskets 36 and 37 may be further extended between the flanges 232, 212, and 222 and the inner side of the cap plate 20 to further seal between the flanges 232, 212, and 222 and the cap plate 20 and electrically insulate between the flanges 232, 212, and 222 and the inner side of the cap plate 20. For example, the negative electrode gasket 35 and the first and second positive electrode gaskets 36 and 37 may help prevent leakage of the electrolyte solution through the terminal holes H3, H1, and H2 by installing the negative electrode terminal 23, the first positive electrode terminal 21, and the second positive electrode terminal 22 in the cap plate 20.

The negative electrode lead tab 53 and the first and second positive electrode lead tabs 51 and 52 may electrically connect the negative electrode terminal 23 and the first and second positive electrode terminals 21 and 22 to the negative electrode 13 and the first and second positive electrodes 11 and 12 of the first and second assembly portions 101 and 102, respectively.

A negative electrode insulation member 63 and first and second positive electrode insulation members 61 and 62 may be respectively provided between the negative electrode lead tab 53, the first and second positive electrode lead tabs 51 and 52, and the cap plate 20 to electrically insulate the first and second positive electrode lead tabs 51 and 52 and the cap plate 20.

In addition, the negative electrode insulation member 63 and the first and second positive electrode insulation members 61 and 62 may be coupled to the cap plate 20 at sides thereof and may surround the negative electrode lead tab 53 and the first and second positive electrode lead tabs 51 and 52, the pillar portions 231, 211, and 221 of the rivet terminals 23a, 21a and 22a, and the flange portions 232, 212, and 222 at the other sides such that a connection structure of the negative electrode lead tab 53 and the first and second positive electrode lead tabs 51 and 42 and the rivet terminals 23a, 21a, and 22a may be stabilized.

An external insulation member 31 may be provided between the plate terminal 23c of the negative terminal 23 and the cap plate 20 for electric insulation between the plate terminal 23c and the cap plate 20. For example, the cap plate 20 may maintain an electric insulation state with the negative electrode terminal 23.

The insulation member 31 and the plate terminal 23c may be coupled to an upper end of the rivet terminal 23a and the upper end may be riveted or welded such that the insulation member 31 and the plate terminal 23c are fastened to the upper end of the rivet terminal 23a. The plate terminal 23c may be provided in the outer side of the cap plate 20, interposing the insulation member 31 therebetween.

Conductive top plates 46 and 47 may be provided between the plate terminals 21c and 22c of the first and second positive electrode terminals 21 and 22 and the cap plate 20 for establishing an electric connection between the plate terminals 21c and 22c and the cap plate 20. That is, the cap plate 20 maintains an electrically connected state with the first and second positive electrode terminals 21 and 22.

The top plates 46 and 47 and the plate terminals 21c and 22c may be coupled to upper ends of the rivet terminals 21a and 22a, and the upper ends may be riveted or welded such that the top plates 46 and 47 and the plate terminals 21c and 22c are fastened to the upper ends of the rivet terminals 21a and 22a. The plate terminals 21c and 22c may be provided in the outer side of the cap plate 20, interposing the top plates 46 and 47 therebetween.

The plate terminal 23c of the negative electrode terminal 23 may have a first thickness t1. The plate terminals 21c and 22c of the first positive electrode terminal 21 and the second positive electrode terminal 22 may each have a second thickness t2. For example, the plate terminals 21c and 22c of the first positive electrode terminal 21 and the second positive electrode terminal 22 may have the same thickness. In an implementation, the first thickness t1 may be equal to or greater than the second thickness t2.

The rivet terminal 23a of the negative electrode terminal 23 may have a first diameter D1. The rivet terminals 21a and 22a of the first and second positive electrode terminals 21 and 22 may each have a second diameter D2. For example, the rivet terminals 21a and 22a of the first and second positive electrode terminals 21 and 22 may have the same diameter. In an implementation, the first diameter D1 may be equal to or greater than the second diameter D2.

The negative electrode terminal 23 may be commonly used by or connected to the first and second assembly portions 101 and 102. The first positive electrode terminal 21 and the second positive electrode terminal 22 may be respectively or separately used by or connected to the first assembly portion 101 and the second assembly portion 102. Thus, a thickness relationship (t1≥t2) and a diameter relationship (D1≥D2) between the negative electrode terminal 23 and the first and second positive electrode terminals 21 and 22 may help reduce the likelihood of and/or prevent the commonly used negative electrode terminal 23 from being overheated.

Due to the common use of the negative electrode terminal 23, the first assembly portion 101 and the second assembly portion 102 may be connected in parallel. For example, in the rechargeable battery of the exemplary embodiment, the two assembly portions, i.e., the first assembly portion 101 and the second assembly portion 102, may be connected in parallel with each other so that the structure may be simplified and the entire size may be reduced, compared to a case of connecting two separate rechargeable batteries in parallel. Although it is not illustrated, in an implementation, the positive electrode terminal may be commonly used, a separate first negative electrode terminal and second electrode negative terminal may be provided, and then the first assembly portion and the second assembly portion may be connected in parallel.

The first positive electrode gasket 36 and the second positive electrode gasket 37 may help prevent the rivet terminals 21a and 22a and the top plates 46 and 47 from being directly electrically connected with each other. For example, the rivet terminals 21a and 22a may be electrically connected to the top plates 46 and 47 through the plate terminals 21c and 22c. Therefore, the plates 46 and 47 and the case 15 may have positive polarity.

A vent hole 24 may be sealed by the vent plate 25 so as to discharge internal pressure and gas generated in the rechargeable battery. When the internal pressure of the rechargeable battery reaches a predetermined pressure level, the vent plate 25 may be ruptured, and thus the vent hole 24 may be opened. The vent plate 25 may have a notch 25a that helps induce the rupture. In an implementation, the vent hole 24 may include two vent holes respectively corresponding to the first and second assembly portions 101 and 102 so as to discharge internal pressure and gas generated from the first assembly portion 101 and the second assembly portion 102, respectively.

Hereinafter, a second exemplary embodiment will be described in detail. Repeated descriptions of the same elements as the first exemplary embodiment and the aforementioned exemplary embodiment may be omitted, and the differences will be described.

Figure 4:
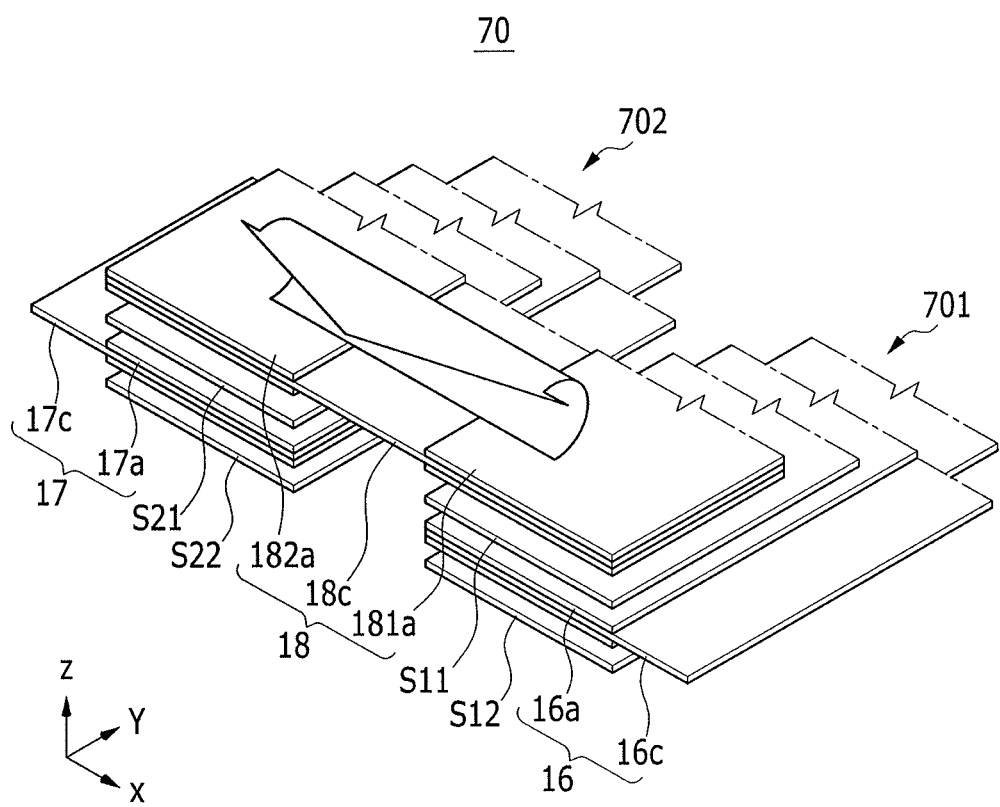
FIG. 4 illustrates a partial perspective view of an electrode assembly used in a rechargeable battery according to a second exemplary embodiment.

FIG. 4 illustrates a partial perspective view of a spirally wound electrode assembly used in a rechargeable battery according to a second exemplary embodiment. Referring to FIG. 4, in an electrode assembly 70 of the rechargeable battery according to the second exemplary embodiment, a first assembly portion 701 may include an eleventh separator S11 and a twelfth separator S12 between an eleventh coated region 181a of a spirally wound negative electrode 18 (e.g., a first electrode) and a first coated region 16a of a first positive electrode 16 (e.g., a second electrode).

A second assembly portion 702 may include a twenty-first separator S21 and a twenty-second separator S22 between a twelfth coated region 182a of a spirally wound negative electrode 18 (e.g., a first electrode) and a second coated region 17a of a second positive electrode 17 (e.g., a second electrode).

The first and second positive electrodes 16 and 17 and the negative electrode 18 may be respectively initially supplied in a strip or elongated state, and the eleventh and twelfth separators S11 and S12 of the first assembly portion 701 and the twenty-first and twenty-second separators S21 and S22 of the second assembly portion 702 may be supplied and then spirally wound in or around the x-axis direction (refer to a direction of the arrow) such that an electrode assembly 70 is manufactured.

A negative electrode uncoated region 18c may be electrically connected to a negative electrode terminal 23 through a negative electrode lead tab 53, and first and second positive electrode uncoated regions 16c and 17c may be electrically connected to the first and second positive electrode terminals 21 and 22 through first and second positive electrode lead tabs 51 and 52.

The electrode assembly 10 of the first exemplary embodiment (including the first assembly portion 101 and the second assembly portion 102) may be manufactured through a layering process. The electrode assembly 70 of the second exemplary embodiment (including the first assembly portion 701 and the second assembly portion 702) may be manufactured through a spiral-winding process.

By way of summation and review, a rechargeable battery may include an electrode assembly that is chargeable and dischargeable, a case accommodating the electrode assembly, a cap plate coupled to an opening of the case, and an electrode terminal connected to the electrode assembly through a lead tab. For example, the rechargeable battery may include an electrode assembly in the case, and may provide a negative electrode terminal and positive electrode terminal (connected to a negative electrode uncoated region and a positive electrode uncoated region of the electrode assembly through lead tabs) in the cap plate.

When twice a voltage and a current output from the rechargeable battery are required, two rechargeable batteries may be used. For example, two rechargeable batteries may be coupled in series or coupled in parallel. Thus, a connection structure in use of the rechargeable batteries may be complicated, and a manufacturing cost of the rechargeable battery may be increased.

The embodiments may provide a rechargeable battery that can simplify a connection structure while being in use and may reduce a manufacturing cost.

According to an embodiment, the electrode assembly may be formed of the first assembly portion and the second assembly portion, and three terminals (e.g., a negative electrode terminal and first and second positive electrode terminals) connected to a first electrode (e.g., a negative electrode) and second electrodes (e.g., first and second positive electrodes) may be formed so that high capacity, high power, and high safety can be realized while simplifying a connection structure in use and reducing a manufacturing cost.

The rechargeable battery according to an embodiment may have high capacity, high power, and high safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of symbols>

10, 70: electrode assembly
11, 12: first positive electrode, second positive electrode
11a, 16a: first coated region
11c, 16c: first positive electrode uncoated region
12a, 17a: second coated region
12c, 17c: second positive electrode uncoated region
13, 18: negative electrode     13c, 18c: negative uncoated region
15: case                        20: cap plate
21, 22: first positive electrode terminal, second positive electrode terminal
21a, 22a, 23a: rivet terminal
21c, 22c, 23c: plate terminal   23: negative electrode terminal
24: vent hole                   25: vent plate
25a: notch                      27: sealing cap
29: electrolyte injection opening  31: insulation member
35: negative electrode gasket
36, 37: first positive electrode gasket, second positive electrode gasket
46, 47: top plate
51, 52: first positive electrode lead tab, second positive electrode lead tab
53: negative electrode lead tab
61, 62: first positive electrode insulation member, second positive electrode insulation member
63: negative electrode insulation member
101, 701: first assembly portion
102, 702: second assembly portion
131a, 181a: eleventh coated region
132a, 182a: twelfth coated region  211, 221, 231: pillar portion
212, 222, 232: flange portion
D1, D2: first diameter, second diameter
H1, H2, H3: terminal hole       H4, H5, H6: through-hole
S11, S12: eleventh separator, twelfth separator
S21, S22: twenty-first separator, twenty-second separator
t1, t2: first thickness, second thickness

What is claimed is:

1. A rechargeable battery, comprising:
an electrode assembly that is chargeable and dischargeable, the electrode assembly including a first assembly portion and a second assembly portion;
a case accommodating the electrode assembly therein;
a cap plate coupled to the case; and
an electrode terminal group connected to the electrode assembly through a lead tab, the electrode terminal group being in a terminal hole of the cap plate,
wherein the first assembly portion and the second assembly portion include an integrally connected first electrode common to the first assembly portion and the second assembly portion, the first assembly portion and the second assembly portion each include respective second electrodes, and the electrode terminal group includes three electrode terminals that are respectively connected to the first electrode and the second electrodes of the first assembly portion and the second assembly portion.

2. The rechargeable battery as claimed in claim 1, wherein the electrode assembly includes:
a first electrode uncoated region and
second electrode uncoated regions spaced apart from the first electrode uncoated region and at lateral sides of the electrode assembly.

3. The rechargeable battery as claimed in claim 2, wherein:
the first electrode uncoated region is a negative electrode uncoated region of the integrally connected first electrode common to the first assembly portion and the second assembly portion, and
the second electrode uncoated regions of the respective second electrodes include:
a first positive electrode uncoated region of the first assembly portion, and
a second positive electrode uncoated region of the second assembly portion.

4. The rechargeable battery as claimed in claim 3, wherein the lead tab is a plurality of lead tabs and the three electrode terminals include:
a negative electrode terminal that is connected to the negative electrode uncoated region through a negative electrode lead tab of the plurality of lead tabs;
a first positive electrode terminal that is connected to the first positive electrode uncoated region through a first positive electrode lead tab of the plurality of lead tabs; and
a second positive electrode terminal that is connected to the second positive electrode uncoated region through a second positive electrode lead tab of the plurality of lead tabs.

5. The rechargeable battery as claimed in claim 4, wherein:
the negative terminal has a first thickness,
the first positive electrode terminal has a second thickness,
the second positive electrode terminal has the same second thickness, and
the first thickness is greater than or equal to the second thickness.

6. The rechargeable battery as claimed in claim 3, wherein:
the first assembly portion is between the negative electrode uncoated region and the first positive electrode uncoated region, and
the second assembly portion is between the negative electrode uncoated region and the second positive electrode uncoated region.

7. The rechargeable battery as claimed in claim 6, wherein the first electrode:
is connected to the negative electrode uncoated region, and
includes an eleventh coated region of the first assembly portion and a twelfth coated region of the second assembly portion.

8. The rechargeable battery as claimed in claim 7, wherein the second electrode includes:

a first coated region that is connected to the first positive electrode uncoated region of the first assembly portion, and a second coated region that is connected to the second positive electrode uncoated region of the second assembly portion.

9. The rechargeable battery as claimed in claim 8, wherein the first assembly portion includes separators, the separators including an eleventh separator and a twelfth separator between the eleventh coated region of the first electrode and the first coated region of the second electrode that are layered.

10. The rechargeable battery as claimed in claim 9, wherein the second assembly portion includes separators, the separators including a twenty-first separator and a twenty-second separator between the twelfth coated region of the first electrode and the second coated region of the second electrode that are layered.

11. The rechargeable battery as claimed in claim 8, wherein the first assembly portion includes separators, the separators including an eleventh separator and a twelfth separator between the eleventh coated region of the first electrode and the first coated region of the second electrode that are spirally wound.

12. The rechargeable battery as claimed in claim 11, wherein the second assembly portion includes separators, the separators including a twenty-first separator and a twenty-second separator between the twelfth coated region of the first electrode and the second coated region of the second electrode that are spirally wound.

13. The rechargeable battery as claimed in claim 1, wherein one of the three electrode terminals is commonly connected to the first assembly portion and the second assembly portion by the first electrode, and the other two of the three electrode terminals are respectively connected to the first assembly portion or the second assembly portion by the respective second electrodes.

* * * * *